United States Patent

Bergqvist

[11] 4,292,602
[45] Sep. 29, 1981

[54] LASER RESONATOR

[75] Inventor: Erik Bergqvist, Karlskoga, Sweden

[73] Assignee: Aktiebolaget Bofors, Sweden

[21] Appl. No.: 897,070

[22] Filed: Apr. 17, 1978

[30] Foreign Application Priority Data

Apr. 28, 1977 [SE] Sweden .................. 77048874

[51] Int. Cl.³ .............................................. H01S 3/02
[52] U.S. Cl. ............................ 331/94.5 C; 331/94.5 D
[58] Field of Search .................. 331/94.5 C, 94.5 D, 331/94.5 Q

[56] References Cited

U.S. PATENT DOCUMENTS

| 3,783,403 | 1/1974 | Hook et al. | 331/94.5 Q |
| 4,099,141 | 7/1978 | Leblanc et al. | 331/94.5 C |
| 4,101,199 | 7/1978 | Christensen | 350/152 |

*Primary Examiner*—William L. Sikes
*Assistant Examiner*—Léon Scott, Jr.
*Attorney, Agent, or Firm*—Pollock, Vande Sande & Priddy

[57] ABSTRACT

The present invention relates to a laser resonator comprising active material disposed in an optical resonator cavity of the folded type including two parallel ray paths, means for exciting the active material, a common end reflector to limit the resonator cavity so that when the active material is excited an oscillating radiation is generated in the resonator cavity, a corner cube prism comprising a number of reflective surfaces for making, by successive reflections, the reflected radiation parallel to the incident radiation, a beam dividing polarizer on one reflective surface of the prism, through which the laser output occurs, and a Q-switching means for providing pulsed lasing.

6 Claims, 4 Drawing Figures

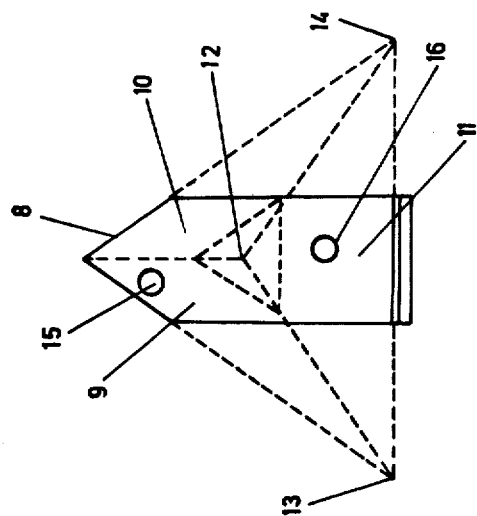
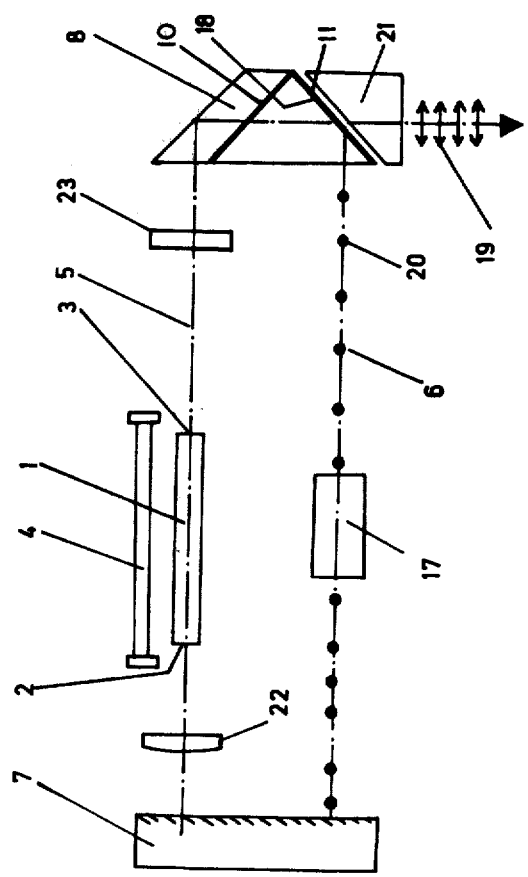
Fig. 2
Fig. 1

LASER RESONATOR

BACKGROUND OF THE INVENTION

Laser resonators are used for instance in such laser range finders in which a radiation pulse is transmitted via an optical system to an object, the distance of which is to be determined. Some of the radiation is reflected back again to the range finder where it is detected. The time interval between the radiated pulse and the received pulse is a measure of the distance between said object and the range finder.

In order to keep the divergence of the radiation beam as small as possible it is previously known to increase the length of the resonator cavity by using a number of reflective surfaces between the end reflectors of the cavity allowing the oscillating radiation in the cavity in a so-called "folded" type cavity to be reflected on these surfaces so that a number of successive straight radiation paths are formed. Then the functional length of the resonator cavity is increased without a consequent increase in the exterior dimension of the laser resonator. In order to function satisfactorily it is important that the reflective surfaces of the laser resonator, including the end reflectors, are very carefully positioned. Any deviations have a nonfavourable influence on the output effect as well as on the form of the radiated beam. Laser resonators of the aforesaid type including two parallel ray paths are very susceptible to any mechanical damage due to shocks and vibrations, which are almost inevitable when the laser resonator is used in military applications. This means that repeated adjustments of the optical components are required.

To some extent this disadvantage can be eliminated by using the same reflector both as a front reflector and an end reflector and by using a corner cube prism allowing the radiation to oscillate via this prism, which is characterized by the fact that reflected radiation is parallel to the incident radiation. In previously known laser resonators of the aforesaid type the common end reflector comprises two parts, one totally reflective and one semitransparent for the radiation in question so that some of the radiation is allowed to pass out of the resonator cavity to form the output laser beam.

SUMMARY OF THE INVENTION

The purpose of the present invention is to provide a laser resonator of the folded type which is optically stable and in which division of the end reflector into two functionally distinct portions is not required.

Another purpose of the invention is to provide a laser resonator which is relatively compact and which includes a small number of optical components.

Thus a main characteristic of the invention is that the end reflector includes a common totally reflective surface and that the corner cube prism includes a beam dividing polarizer to separate an output laser beam.

In one preferred embodiment of the invention the beam dividing polarizer comprises a dielectric polarization layer which is coated on one of the reflective surfaces of the corner cube prism. The properties of the layer are such that some of the radiation is transmitted through the layer and the reflective surface and out of the resonator cavity to form the output laser beam.

In another preferred embodiment of the invention the corner cube prism is so orientated that the radiation is incident on the polarized reflective surface of the prism with an angle of incidence corresponding close to the so-called Brewster angle.

BRIEF DESCRIPTION OF THE DRAWINGS

The nature of the invention will be described more in detail in the following description with reference to the accompanying drawings, in which:

FIG. 1 is a schematic view of a preferred embodiment according to the invention;

FIG. 2 is a corner cube prism intended to be utilized in the laser resonator;

DESCRIPTION OF THE PREFERRED EMBODIMENTS

Figure 4:
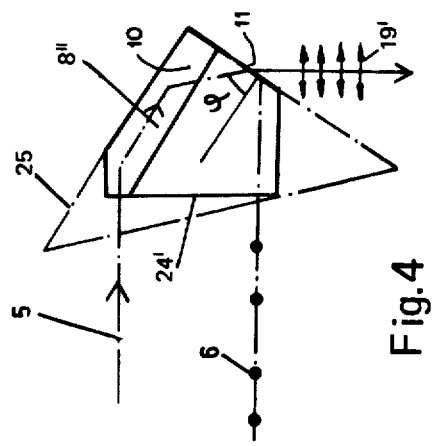
FIG. 4 is another embodiment of the corner cube prism used in the laser resonator according to FIG. 3.

The laser resonator shown in FIG. 1 comprises an active laser rod, for instance a neodymium doped glass rod. The laser rod 1 is disposed in the resonator cavity and is provided with plane end surfaces 2 and 3. Means 4 for exciting the laser rod is positioned adjacent the rod so that an oscillating radiation beam is generated in the cavity. Said means 4 for exciting the laser rod may for instance consist of a flash bulb by means of which the laser medium is optically pumped; that is, so much energy is supplied to the laser rod so that laser action takes place. Means for pumping a laser medium and the laser medium itself are well-known in the art and will not be described in any detail in the following.

The laser resonator further comprises an optical resonator cavity of a so-called folded type; that is, including two parallel ray paths, so that the total radiation path consists of two straight radiation paths 5 and 6 which are parallel to each other and limited by an end reflector in the form of a totally reflective mirror 7. The reflective surface of mirror 7 is faced to one of the end surfaces 2 of the laser rod and orientated parallel to said surface 2. The entire reflective surface is totally reflective; that is all the incident radiation is reflected back again.

A corner cube prism 8 is positioned opposite to the other end surface 3 of the laser rod. A characteristic of such a prism is to give, by successive reflection in its reflective surfaces, a parallel reflection of the incident radiation emanating from the mirror. Independent of the angle of incidence the outgoing radiation is parallel to the incident radiation.

The corner cube prism includes three plane polished reflective surfaces 9, 10 and 11 (see FIG. 2) which are in pairs perpendicular to each other to form the corner of a cube. From considerations of space, however, the corner 12 of the cube has been cut. As illustrated in FIG. 2 also the corners 13 and 14 in the cube have been cut. In FIG. 2 the in aperture 15 for a beam incident on the reflective surface 9 is shown, the beam is reflected on the surface 10, which is perpendicular to the surface 9, and then on the surface 11 on which it leaves the prism through exit aperture 16. As already mentioned the output radiation beam is parallel to the incident beam even if the prism is inaccurately orientated relative to the end reflector 7.

The resonator cavity further comprises a Q-switching means having a Pockels cell 17 in the form of a crystal of a material having electro-optical properties, located in the other radiation path 6 between end reflector 7 and corner cube prism 8. Such Q-switching means are well known in the art and are used in connections where it is required that the output radiation must be in the pulse form rather than continuous radiation, for instance in laser range finders. The Q-switching function is established by the fact that the degree of reflection of the radiation which passes the crystal is changed by applying an electric field on the crystal.

The output radiation from the laser resonator passes from the resonator cavity by means of a beam dividing polarizer in the form of a dielectric polarization layer 18 disposed on the reflective surface 11 of the corner cube prism. A characteristic of this layer is to divide the incident radiation into two components, one component 19 with a polarization plane which coincides with the image plane of FIG. 1 and which passes through the reflective surface 11 out of the resonator cavity to form the output laser beam; and another component 20 with a polarization plane perpendicular to the first-mentioned component, which reflected on the reflective surface 11 and then is propagated along the other radiation path 6 in the resonator cavity. A corrector prism 21 is positioned adjacent the reflective surface 11 and functions as a beam corrector; that is, it gives the output laser beam the desired direction. In addition to the components just mentioned, the resonator cavity also comprises an adjustable lens 22 for fine adjustment of the radiation beam and a phase shifting element 23 which determines the degree of laser action of the laser resonator.

In the following the function of the laser resonator will be described, in the case of blocked laser function as well as in the case of laser action, that is, when a laser pulse is emitted. Blocking of the laser function can be achieved by applying an electric field with a certain field strength to the Pockels-cell. The plane polarized radiation component 20 incident on the Pockels cell is then, by a single passage through the cell, tranferred to a circular polarized radiation component which is reflected on the end reflector and which then passes through the cell again. At this passage the circular polarized radiation beam is transferred to a plane polarized beam component again, but now the polarization plane coincides with the image plane. Thus, by this double passage through the Pockels cell, the polarization plane has been moved through an angle of 90°. The component is then incident on the reflective surface 11 of the corner cube prism and is now plane polarized in the passage plane of the polarization layer so that it passes out of the resonator cavity. No radiation component returns to the laser rod to give the necessary amplification for laser action.

If now the field generating voltage applied to the Pockels cell is changed to zero than the polarization plane of the radiation beam which passes the cell is not changed. The radiation component incident on the reflective surface 11 of the corner cube prism along the radiation path 6 thus is reflected on this surface, returned to the laser rod and amplified. In this case the radiation path with the Pockels cell maintains the laser action with the result that a laser pulse is emitted.

Figure 3:
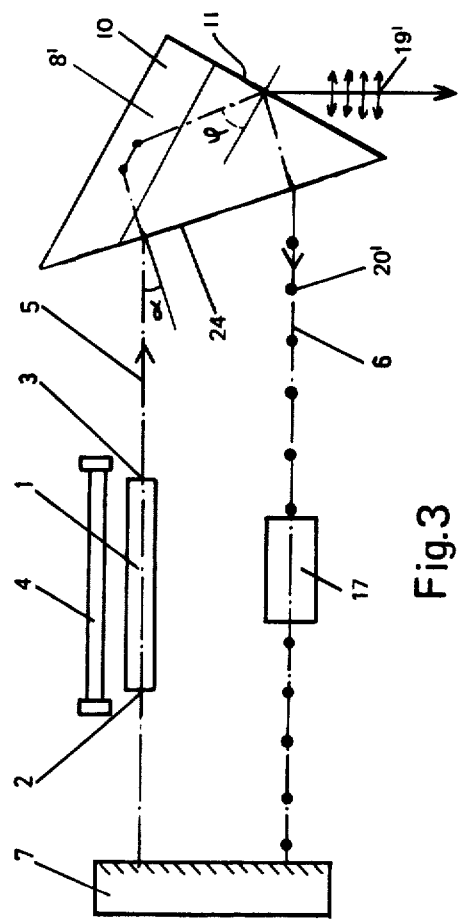
FIG. 3 is a schematic view of another preferred embodiment according to the invention.

FIGS. 3 and 4 illustrate an alternative embodiment of the invention, in which the construction of the laser resonator is even more simplified by another orientation of the corner cube prism. FIG. 3 corresponds to FIG. 1 and the same reference numerals have been used for corresponding components in the two figures. The corner cube prism 8' has the same characteristics as the prism 8, i.e. it gives parallel reflection independent of the angle of incidence of the incident radiation beam.

In order to separate the output radiation beam from the laser resonator the third reflective surface in the corner cube prism is coated with a dielectric polarization layer 18' which, corresponding to the layer 18 of FIG. 1, divides the incident radiation into two components 19' and 20'. Practically it is difficult and involves heavy costs to attain a polarization layer which gives a complete separation between the two components. In order to facilitate the division and simplify the construction of the polarization layer the prism 8' is orientated in such a way that the angle of incidence of the radiation on the third reflective surface nearly coincides with the so-called Brewster angle. For this angle the reflection equals zero for the component which has a polarization plane which coincides with the image plane, i.e. the component 19' passing through the reflective surface out of the resonator cavity. The task of the polarization layer is then restricted to increase the reflectivity for the component 20' to the highest possible value. A further advantage in using the Brewster angle of incidence is the fact that the output component 19' is perpendicular to the reflected component 20'. Thereby the beam correcting element 21 illustrated in FIG. 1 can be avoided.

For a normal glass prism the Brewster angle is approximately 35°. This means that the prism 8' need to be turned forwards an angle of approximately 15° compared with the prism 8 of FIG. 1. This also means that the radiation along the radiation paths 5 and 6 have an angle of incidence which is approximately 15° on the surface 24 of the corner cube prism 8'.

In order to adjust the prism 8' as carefully as possible, it is an advantage, however, if the radiation is incident perpendicular to the surface 24. Therefore the corner cube prism 8" can be cut, as illustrated in FIG. 4, so that the surface 24' which is faced to the resonator cavity is perpendicular to the radiation paths 5 and 6. In addition to the fact that the adjustment of the prism then is facilitated, the anti reflex treatment of the surface 24' is simplified. From considerations of space, in FIG. 4 also other parts of the corner cube prism 8" have been cut. In FIG. 4 the non-cut prism 8" is indicated by dotted lines 25.

I claim:

1. A laser apparatus, comprising:
   an optical resonant cavity of the folded type, said cavity having a first and a second end, both ends of said cavity being limited by the same totally reflecting mirror;
   an active material arranged in said cavity;
   means for exciting said active material to generate oscillating radiation moving between said ends in said cavity; and
   a corner cube prism arranged between said ends in said cavity, said prism comprising a plurality of plane reflective surfaces which successively reflect said radiation so that reflected radiation is parallel to incident radiation, one of said reflective surfaces having disposed thereon a beam dividing polarizer means for separating the output beam of the laser from the radiation oscillating in said cavity.

2. A laser apparatus according to claim 1, wherein said beam dividing polarizer means comprises a dielectric polarization layer disposed on said one surface, said layer having the property of allowing to pass out of said cavity the component of said radiation which is polarized in a predetermined passage plane.

3. A laser apparatus according to claim 2, wherein said layer causes a plane polarized radiation component to be reflected at said one surface when its plane of polarization is perpendicular to said passage plane.

4. A laser apparatus according to claim 2, wherein said prism is oriented so that radiation strikes said one surface and said dielectric polarization layer with an angle of incidence nearly coinciding with the Brewster angle.

5. A laser apparatus according to claim 4, wherein said prism is modified to comprise a surface which is perpendicular to the path of incident and reflected radiation striking said prism and oscillating in said cavity.

6. A laser apparatus according to claim 1, further comprising Q-switching means positioned in said cavity to receive reflected radiation from said prism, for producing a pulsed output beam.

* * * * *